US009111670B2

(12) United States Patent
Nayak et al.

(10) Patent No.: US 9,111,670 B2
(45) Date of Patent: *Aug. 18, 2015

(54) CERAMIC, GRADED RESISTIVITY MONOLITH USING THE CERAMIC, AND METHOD OF MAKING

(71) Applicant: General Electric Company, Schenectady, NY (US)

(72) Inventors: Mohandas Nayak, Bangalore (IN); Sundeep Kumar, Bangalore (IN); Padmaja Parakala, Bangalore (IN); Sudhakar Eddula Reddy, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 131 days.

This patent is subject to a terminal disclaimer.

(21) Appl. No.: 13/684,596

(22) Filed: Nov. 26, 2012

(65) Prior Publication Data

US 2013/0135078 A1 May 30, 2013

(30) Foreign Application Priority Data

Nov. 30, 2011 (IN) .......................... 4130/CHE/2011

(51) Int. Cl.
*H01C 7/10* (2006.01)
*H01C 13/02* (2006.01)
(Continued)

(52) U.S. Cl.
CPC *H01C 13/02* (2013.01); *B22F 7/02* (2013.01); *B22F 7/06* (2013.01); *B32B 9/00* (2013.01); *B32B 15/00* (2013.01); *C04B 35/453* (2013.01); *C22C 5/06* (2013.01); *C22C 29/12* (2013.01); *C22C 32/0021* (2013.01); *H01C 7/18* (2013.01);
(Continued)

(58) Field of Classification Search
CPC ........ H01C 10/36; H01C 10/38; H01H 15/04; H01H 9/42
USPC ............................................... 338/20
See application file for complete search history.

(56) References Cited

U.S. PATENT DOCUMENTS 2,956,255 A   10/1960   Ragnvald
6,373,672 B1   4/2002   Quoirin
(Continued)

FOREIGN PATENT DOCUMENTS

DE   3147260 A1   6/1983
EP   0517618 A1   12/1992
(Continued)

OTHER PUBLICATIONS

Chen, Curren Communicaiton in Arcless Interruptions with PTC (Positive Temperature Coefficient resistivity), Print ISBN: 0-7803-6667-0, pp. 141-147, Issue Date: 2001.
(Continued)

*Primary Examiner* — Kyung Lee
(74) *Attorney, Agent, or Firm* — GE Global Patent Operation; Stephen G. Midgley

(57) ABSTRACT

According to one embodiment, a monolithic cassette with graded electrical resistivity is presented. The monolithic cassette has a continuous grain structure between a first end and a second end; wherein electrical resistivity of the monolithic cassette is graded such that the resistance varies continuously from the first end to the second end. Methods and compositions for forming the monolithic cassette are also presented.

16 Claims, 5 Drawing Sheets

(51) Int. Cl.

| | |
|---|---|
| C04B 35/453 | (2006.01) |
| C22C 5/06 | (2006.01) |
| B22F 7/02 | (2006.01) |
| H01C 7/18 | (2006.01) |
| H01C 13/00 | (2006.01) |
| B22F 7/06 | (2006.01) |
| C22C 29/12 | (2006.01) |
| C22C 32/00 | (2006.01) |
| B32B 9/00 | (2006.01) |
| B32B 15/00 | (2006.01) |

(52) U.S. Cl.
CPC ............ *H01C 13/00* (2013.01); *B22F 2203/11* (2013.01); *B22F 2207/01* (2013.01); *B22F 2998/10* (2013.01)

(56) References Cited

U.S. PATENT DOCUMENTS

| | | | | |
|---|---|---|---|---|
| 6,388,867 | B1 | 5/2002 | Rakus | |
| 8,773,235 | B2 * | 7/2014 | Bohori et al. | 338/172 |
| 2001/0040147 | A1 | 11/2001 | Doughty | |
| 2003/0201858 | A1 | 10/2003 | Leone | |
| 2005/0046539 | A1 | 3/2005 | Ciarcia | |
| 2007/0056931 | A1 | 3/2007 | Turkmen | |
| 2008/0218297 | A1 | 9/2008 | Kim | |
| 2009/0257174 | A1 | 10/2009 | Rane | |
| 2013/0134028 | A1 * | 5/2013 | Bohori et al. | 200/550 |

FOREIGN PATENT DOCUMENTS

| | | |
|---|---|---|
| EP | 2249367 | 11/2010 |
| FR | 2581790 A1 | 11/1986 |

OTHER PUBLICATIONS

Search Report and Written Opinion for EP Application No. 12194916.8 dated Apr. 23, 2013.

Volintiru, I. et al.: "Evolution of the electrical and structural properties during the growth of Al doped Zn0 films by remote plasma-enhanced metalorganic chemical vapor deposition", Journal of Applied Physics, New York, vol. 102, No. 4, Aug. 27, 2007, pp. 1-9.

Chung, et al.: "The influence of titanium on the properties of zinc oxide films deposited by radio frequency magnetron sputtering", Applied Surface Science, Elsevier, Amsterdam, NL, vol. 254, No. 9, Feb. 8, 2008. pp. 2615-2620.

Imai, T. et al.: "Development of High Gradient Zinc Oxide Nonlinear Resistors and Their Application to Surge Arresters", New York, vol. 13, No. 4, Oct. 1, 1998, pp. 1182-1187.

Wang, Y. et al.: "The preparation and properties of new silver-metal oxide graded composite electrical contact materials", Key Engineering Materials, Trans Tech Pub, Stafa-Zurich, CH, vol. 280-283, Jan. 1, 2005, pp. 1917-1920.

Izaki, M. et al: "Preparation of functionally graded Zn0 film by electrochemical reaction from an aqueous solution", Materials Science Forum, Trans Tech Pub, Switzerland, vol. 308-311, Jan. 1, 1999, pp. 290-294.

Itoh, Y. et al.: "Thermal stress characteristics of a functionally graded Zn0 element with high energy absorption capability", Nippon Kinziku Gakkaishi, Journal of JP institute of Metals, Tokyo, Japan, vol. 63, No. 2, Jan. 1, 1999 pp. 160-166.

Izaki, M. et al.: "Characterization of functionally graded zinc oxide film prepared from aqueous solution by controlling cathode potential", Nippon Kinziku Gakkaishi, Journal of JP Institute of Metals, Tokyo, Japan, vol. 62, No. 11, Jan. 1, 1999 pp. 1063-1068.

Ponomarev, et al.: "Controlling the resistivity gradient in chemical vapor deposition-deposited aluminum-doped zinc oxide", Journal of Applied Physics, vol. 112, No. 4, Aug. 15, 2012 pp. 1-7.

* cited by examiner

| LAYER | OXIDE COMPOSITE (GRAMS) | SILVER PERCENTAGE | SILVER (GRAMS) | RESISTIVE POWDER (GRAMS) |
|---|---|---|---|---|
| 1 | 2.51 | 44% - 45% | 1.964 - 2.0454 | 4.4742 - 4.5554 |
| 2 | 2.51 | 46% - 46.5% | 2.1296 - 2.1729 | 4.6396 - 4.6829 |
| 3 | 2.51 | 47% - 48% | 2.2169 - 2.3076 | 4.7269 - 4.8177 |
| 4 | 2.51 | 50% - 52% | 2.5000 - 2.7083 | 5.0100 - 5.2183 |

*FIG. 3*

CERAMIC, GRADED RESISTIVITY MONOLITH USING THE CERAMIC, AND METHOD OF MAKING

BACKGROUND OF THE INVENTION

Embodiments presented herein relate generally to monolithic structures, and more particularly to electrically resistive monolithic structures.

One common method of controlling or varying current or voltage in an electrical circuit is by the use of a variable-resistor or rheostat. Typically, for electrical equipment with a high power rating, rheostats may be used for equipment startup and shutdown. For instance, brushed DC motors may have a manual rheostat starter, a three point rheostat starter, a four point rheostat starter, or the like, to gradually increase armature current from a small value to the rated operational value to protect the DC motor. However, during operation the rheostat switches from one resistance branch to another in a step manner. Such switching operation may result in arcing between the moving contact and the resistance branches, due to the high voltage and/or current supplied to the electrical equipment.

Another known solution includes multiple discrete resistive layers assembled in a stack, with the moving contact designed to slide over the stack. However, with operational wear, the surface of the stack in contact with the moving contact (referred to herein as "sliding surface") is ground down by the moving contact, thereby resulting in an uneven sliding surface. Therefore, the moving contact may not maintain adequate contact pressure over the length of the stack. Further, the different resistive layers of the stack may be ground down to different levels based on the hardness of the resistive layer, thereby forming 'steps' on the sliding surface. This may result in the possibility of the moving contact being stuck at a step between successive resistive elements. Uneven contact pressure and the stepped profile of the sliding surface may both lead to arcing between the moving contact and the sliding surface. Also, such assembled stacks are difficult to machine and polish to obtain a smooth sliding surface. Often, the assembled stacks crack or break during machining.

Therefore, there is a need in the art, for a resistive element that addresses these and other shortcomings associated with known solutions.

BRIEF SUMMARY OF THE INVENTION

According to one embodiment, a monolithic cassette with graded electrical resistivity is presented. The monolithic cassette has a continuous grain structure between a first end and a second end; wherein electrical resistivity of the monolithic cassette is graded such that the resistance varies continuously from the first end to the second end. Methods and compositions for forming the monolithic cassette are also presented.

According to one embodiment, an electrically resistive composition is presented. The composition comprises 45 to 58 percent by weight of a ceramic composition, wherein the ceramic composition comprises a substantially homogenous mixture of 99.5 to 99.7 percent zinc oxide powder, and 0.3 to 0.5 percent aluminum oxide powder. The composition contains 42 to 55 percent by weight of silver powder wherein electrical resistivity of the composition varies from 1 micro ohm-m to 1 mega ohm-m based on a ratio of the ceramic composition to silver powder.

According to one embodiment, a method of forming a monolithic cassette is presented. A plurality of resistive powders are introduced into a die to form a stack of layers. Each of the plurality of resistive powders comprises a ceramic composition and a conductive composition. Each layer comprises a distinct weight ratio of the ceramic composition and the conductive composition. The plurality of resistive powders are compacted into a green cassette at pressures between 10 mega pascal and 1 giga pascal, and at temperatures between 15 degree Celsius and 1600 degree Celsius. The green cassette is then sintered at a temperature between 800 degree Celsius and 2000 degree Celsius for a duration of 2 to 100 hours.

BRIEF DESCRIPTION OF THE DRAWINGS

FIG. 3 is a table illustrating example compositions for resistive powder for forming a monolithic cassette, according to one embodiment;

DETAILED DESCRIPTION OF THE INVENTION

According to one embodiment, a monolithic cassette that exhibits a graded resistivity over the length of the monolithic cassette, is presented. The monolithic cassette may be employed, for example, in arcless switchgear. Electric arcing is common in circuit breakers when circuit breakers trip due to electrical faults. In circuit breakers, contacts must carry the load current without excessive heating, and must also withstand the heat of the arc produced when circuit is opened. Contacts are made of highly conductive materials. Service life of the contacts is limited by the erosion of contact material due to arcing while opening the circuit. An arc might be a potential cause of fire in some cases especially during leakage of inflammable gases. The monolithic cassette may be used in circuit breakers to substantially suppress or completely eliminate electrical arcing. The monolithic cassette may be disposed in the arcless switchgear such that a moving contact of the switchgear slides over the monolithic cassette during a switching operation. While switching off, the moving contact may slide from a low resistivity end to a high resistivity end of the monolithic cassette, while switching from a closed circuit position to an open circuit position. Such a controlled increase of resistance during switching prevents sudden changes in electric potential difference between the fixed contact and the moving contact, thereby substantially suppressing or completely eliminating electrical arcing. While switching on, the moving contact may slide from the low resistivity end to the high resistivity end, while switching from the open circuit position to the closed circuit position.

Figure 1:
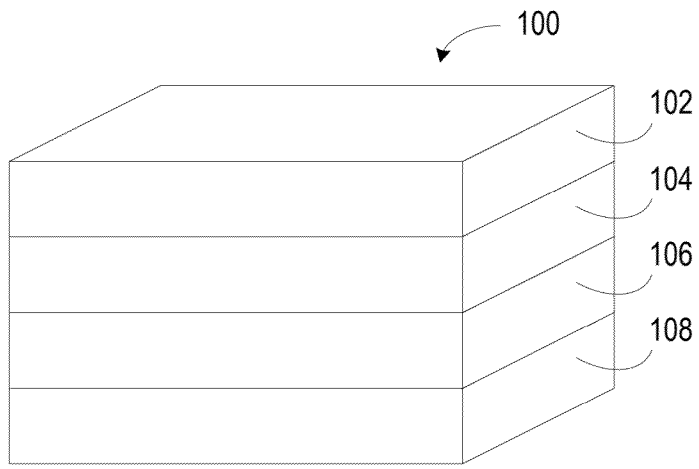
FIG. 1 is a perspective view of an example green cassette, according to one embodiment.
Figure 2:
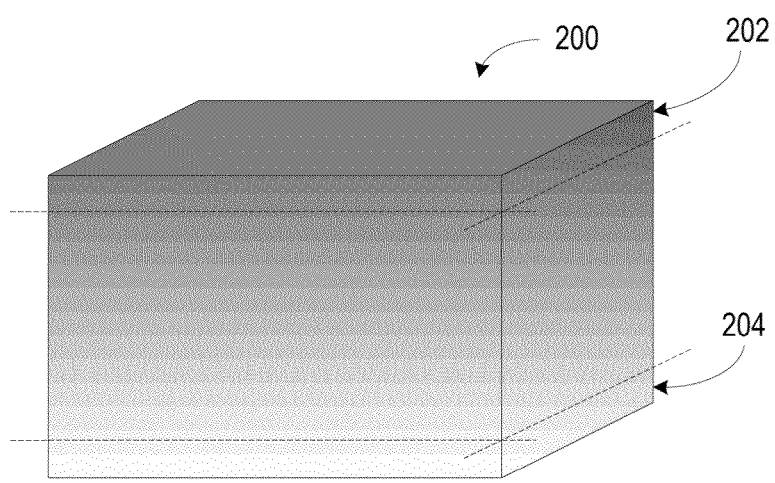
FIG. 2 is a perspective view of an example monolithic cassette, according to one embodiment.

In one embodiment, the monolithic cassette may be formed by first stacking multiple layers of resistive powders, such that each layer exhibits a different resistivity. The stacked layers are then compacted to form a green cassette. FIG. 1 illustrates an example green cassette 100. The green cassette 100 includes 4 layers 102, 104, 106, and 108, of resistive powders, each exhibiting a different resistivity. An example composition of the resistive powders is described below, in conjunction with FIG. 3. The green cassette may also have physical interfaces (i.e. physical boundaries) between successive layers owing to different proportion of compositions in the various resistive powders. The green cassette may then be sintered to form the monolithic cassette that exhibits graded resistivity over the length of the monolithic cassette. The monolithic cassette has a continuous grain structure, without physical boundaries between layers, and may have a graded electrical resistivity such that the resistance varies continuously between the ends of the monolithic cassette. FIG. 2 illustrates an example monolithic cassette 200, according to one embodiment. The monolithic cassette 200 formed after sintering, does not include physical boundaries, however, exhibits a continuous grain structure between ends 202, and 204. The dotted lines indicate representative regions of ends 202 and 204. However, the ends 202 and 204 may be as thin as top and bottom surfaces of the monolithic cassette 200, or may have a finite thickness, greater than, for instance, 0.01 mm.

The resistive powders may be a mixture of a high resistivity material (e.g. ceramic materials) and a low resistivity (e.g. metals and metal alloys) material. The resistivity of the resistive powder may be controlled by controlling the proportion of the high resistivity material and low resistivity material in the mixture. Thus, multiple layers exhibiting different resistivity may be obtained using mixtures of varying proportions of the same high resistivity material and the same low resistivity material. Such use of the same family of mixtures may typically result in substantially same shrinkage and substantially same sintering temperature of each of the multiple layers, which in turn may reduce or substantially eliminate uneven shrinkage, formation of cracks, airgaps, and voids during sintering of the multi-layered green cassette.

The high resistivity material may be a ceramic composition including, for example, zinc oxide, aluminum oxide, aluminum nitride, boron nitride, silicon dioxide, indium tin oxide, and combinations thereof. The ceramic compositions may impart properties such as high thermal stability, high temperature resistance, surface hardness, mechanical strength, and so forth, to the monolithic cassette. The low resistivity material may be a conductive composition including, without limitation, silver, copper, gold, aluminum, indium, tin, gallium, nickel, titanium, zinc, lead, carbon, iron, tungsten, molybdenum, alloys thereof, and mixtures of the metals. The low resistivity material may impart the desired electrical properties to the monolithic cassette.

In one implementation, the high resistivity material may be a ceramic composition powder including, for example, zinc oxide and aluminum oxide, and the low resistivity material may be a conductive metal powder, such as silver. Zinc oxide is less vulnerable to suffer from hot spot or hot cracking. Hot spotting is a phenomenon of formation of an irreversible deformity or crack during compaction. Zinc oxide has a resistivity of the order of 10e7 ohm meter. Mixing the zinc oxide with about 0.3 to 0.5 percent (by weight of zinc oxide) aluminum oxide yields a ceramic composition with a resistivity of the order of 10e3 ohm meter to 10e4 ohm meter. Addition of silver to the ceramic composition further reduces the resistivity to the order of 10e-4 ohm meter. Silver exhibits an extremely low resistivity of $15.87 \times 10^{-9}$ ohm meter. By controlling the proportion of ceramic composition to silver, resistivity of the resistive powder may be varied from 10e-4 ohm meter to 10e4 ohm meter.

The ceramic composition powder may be prepared, for example by wet mixing zinc oxide powder having a grain size of 4 micron, and 0.4 percent (by weight of zinc oxide powder) aluminum oxide having a grain size of 5.6 micron, in isopropyl alcohol for about thirty minutes. The wet mixture may then be dried at 100 degree Celsius. Post drying, the ceramic composition powder may again be dry mixed or wet mixed in isopropyl alcohol.

Various resistive powders may then be prepared by mixing the ceramic composition powder with silver powder. The silver powder may have a grain size between 2 and 3.5 micron. The ceramic composition powder and silver powder may be mixed in isopropyl alcohol for thirty minutes, and then dried. The drying may be carried out at ambient temperature, or in an oven at elevated temperatures. The proportion of the ceramic composition powder to silver powder controls the resistivity of the resistance powder. For example, the resistive powder may include 42 to 45 percent by weight silver. In other words, the resistive powder may include 45 to 58 percent by weight ceramic composition. In one embodiment, the resistive powders may have an electrical resistivity between 1 micro ohm-centimeter and 1 mega ohm-centimeter. FIG. 3 is a table illustrating example proportions of the ceramic composition and silver in the resistance powders for 4 different layers of an example green cassette, according to one embodiment. It should be appreciated that other proportions of the ceramic composition and silver may be used, and additional or fewer layers may be used, as per the requirements of the monolithic cassette.

Once the different resistive powders are obtained, the resistive powders are introduced into a die to form a stack of layers. The resistive powders may be introduced starting with the resistive powder exhibiting highest resistivity, and subsequently over layering with other resistive powders with successively decreasing resistivity. Alternatively, the die may be filled starting with the resistive powder exhibiting the lowest resistivity and subsequently over layering with other resistive powders of successively increasing resistivity. To ensure uniform thickness of each layer, after introducing each resistive powder, the resistive powder may be settled into the die, for example, by vibrating the die, or by using a plunger to obtain a layer of uniform thickness. The introducing and settling process may be repeated for each subsequent layer.

The stack of layers of the resistive powders is then compacted under a suitable pressure to form the green cassette. The pressure may range from 10 mega pascal to 1 giga pascal, based on the desired structural characteristics of the monolithic cassette, such as mechanical strength, porosity, and so forth. In one embodiment, the resistive powders including zinc oxide, aluminum oxide, and silver may be compacted at pressures between 10 mega pascal and 60 mega pascal. The resistive powders may be compacted using known compaction techniques such as, but not limited to, uniaxial pressing, cold isostatic pressing, hot isostatic pressing, and so forth. During the pressing operation, temperatures may be set to values between 15 degree Celsius (for example, in cold isostatic pressing) and 1600 degree Celsius (for example, in hot isostatic pressing). Alternatively, the stacked layers may be compacted using extrusion processes such as hot extrusion, cold extrusion, hydrostatic extrusion, and so forth. Even though compaction process brings the powder particles together in the green cassette, the green cassette may exhibit a porosity, and thus limited structural strength. Further, the green cassette may also have physical interfaces (i.e. physical boundaries) between successive layers owing to different proportion of the ceramic composition and silver in the various resistive powders.

The green cassette may subsequently be sintered to form the monolithic cassette. The temperature for sintering may be chosen based on the constituents of the resistive powder.

Typically, the green cassette may be sintered at temperatures between 800 degree Celsius and 2000 degree Celsius, and for a duration between 2 hours and 100 hours.

In the embodiment where the resistive powders include zinc oxide, aluminum oxide, and silver, the green cassette may be sintered at a temperature between 850 degree Celsius, and 950 degree Celsius. The rate of change of temperature during sintering may be about 1.5 to 2.5 degree Celsius per minute. In other words, the green cassette is heated from room temperature to about 850-950 degree Celsius while controlling the rate of temperature rise between 1.5 and 2.5 degree Celsius per minute. The green cassette may be sintered in an atmosphere of air. The sintering process may be carried out for a duration of 22 to 26 hours. For one example monolithic cassette, sintering of the green cassette is done at a temperature of 900 degree Celsius in an atmosphere of air for a duration of 24 hours, with the rate of change of temperature set to 2 degree Celsius per minute.

Figure 4:
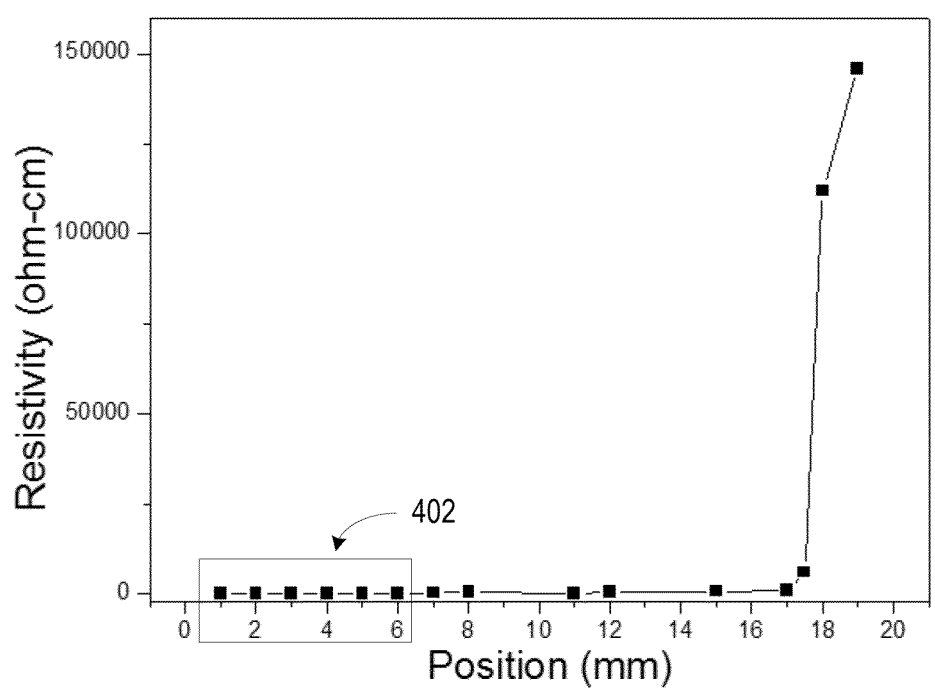
FIG. 4 is a graph illustrating an example relationship of resistivity plotted against longitudinal position on the monolithic cassette, according to one embodiment.
Figure 5:
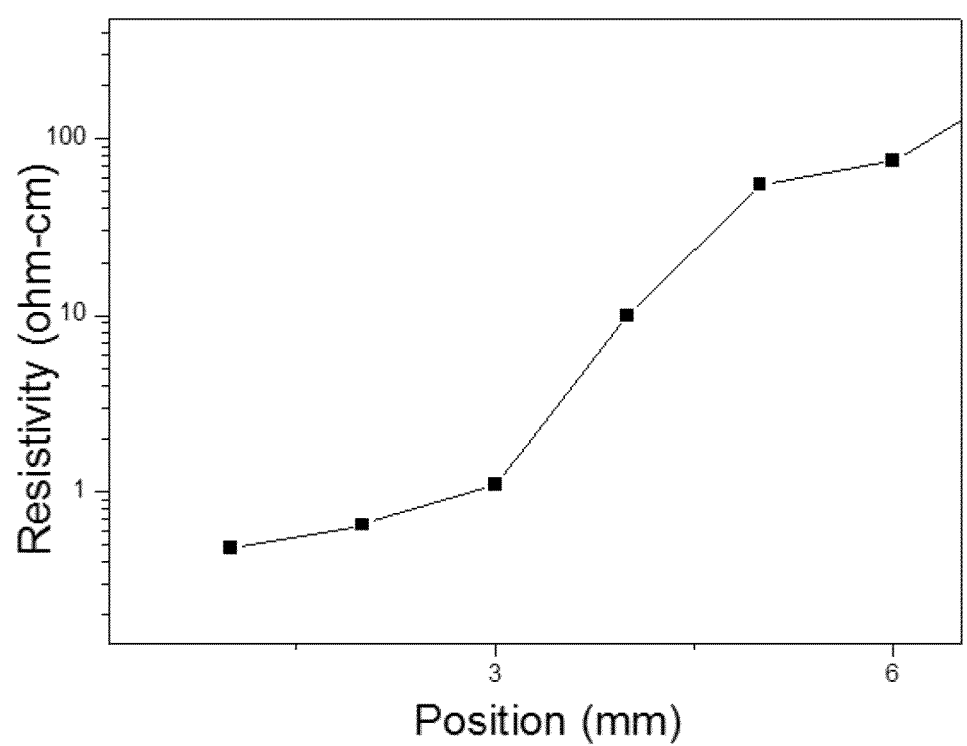
FIG. 5 is an expanded view of a portion of the graph illustrating an example relationship of resistivity plotted against longitudinal position on the monolithic cassette, according to one embodiment.

The green cassette, prior to sintering, includes distinct layers of different resistive powders, each layer exhibiting a distinct resistivity, and where the resistivity may change in discrete steps while moving across layer boundaries. Sintering causes atomic diffusion of silver through the green cassette. The silver atoms migrate along the pores present in the green cassette. At the sintering temperature new crystallites form at the physical interfaces between the layers, such that the original inter-layer boundaries disappear, thus forming a continuous grain structure in the monolithic cassette. The monolithic cassette may now exhibit a smooth transition of resistivity along the longitudinal surface. A graph of resistivity of the monolithic cassette against longitudinal position will illustrate smooth transitions. One such resistivity graph for an example experimental set-up is illustrated in FIG. 4. An expanded view of the region marked by a rectangle 402 is shown in FIG. 5. It will be appreciated that the measured minimum resistivity value that can be measured will limited by the experimental measurement set-up, for example, by contact resistance of contacts used in an experimental measurement set-up.

Under controlled temperature, rate of heating, and atmosphere, the porosity of the green cassette may decrease, resulting in a monolithic cassette that is denser than the green cassette.

After sintering, the monolithic cassette may then be cooled under controlled temperature decrease, to impart the desired hardness, and structural strength to the monolithic cassette. The rate of cooling may be between 1.5 and 2.5 degree Celsius per minute. For one example monolithic cassette the rate of cooling is 2 degree Celsius per minute. Controlling the rate of change of temperature while cooling may substantially reduce or completely eliminate the formation of cracks or other deformities in the monolithic cassette upon solidification.

Figure 6:
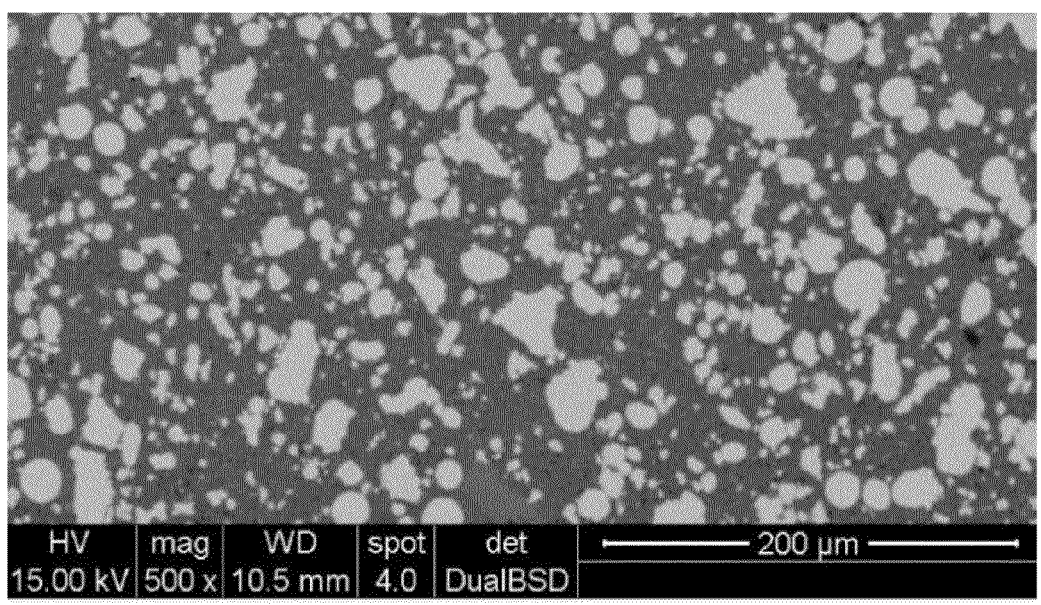
FIG. 6 illustrates a grain structure of a monolithic cassette, according to one embodiment.

The resulting monolith cassette thus has a continuous grain structure and a resistivity graded from 10e-6 ohm meter to 10e6 ohm meter along the longitudinal surface. FIG. 6 is a snapshot of microstructure for an example monolithic cassette along a vertical axis of the monolithic cassette, according to one embodiment. It can be seen that the monolithic cassette exhibits a uniform crystalline structure with no boundaries. Also no cracks and voids are observable in the magnified image. The monolithic cassette may have a Root Mean Squared (RMS) surface roughness value of less than 100 micron. The hardness of the monolithic cassette may be greater than 3 on the Mohs scale. The monolithic cassette may be thermally stable at temperatures exceeding 300 degree Celsius. Due to the controlled rate of cooling, the monolithic cassette may exhibit mechanical strength exceeding 150 mega pascal.

One embodiment presented herein illustrates a monolithic cassette exemplified with four layers of resistive powders. However, it should be appreciated that the monolithic cassette may include any number of layers of resistive powders, depending on the design and application parameters. According to the methods and compositions presented herein, a monolithic cassette may be formed, that exhibits resistivity graded between the two ends of the monolithic cassette. In some embodiments, the resistivity may be graded by up to 12 orders of magnitude between the two ends of the monolithic cassette. In some other embodiments, the resistivity may be graded by at least 12 orders of magnitude between the two ends of the monolithic cassette. The orders of magnitude of resistivity may be chosen based on operating parameters of the switchgear within which the monolithic cassette is to be deployed. Such operating parameters include, for example, operating voltage and current, operating power, and so forth. For instance, in high power industrial applications, the monolithic cassette may be designed to have a resistivity graded by 8 orders of magnitude. While, for low power domestic applications, the monolithic cassette may be designed to have a resistivity graded by, for example, 6 orders of magnitude. For higher power industrial applications requiring critical fire safety switchgear, the monolithic cassette may be designed to have a resistivity graded by, for example, 12 or 13 orders of magnitude.

Further, progression of resistivity in the layers may be tailored based on a mathematical function. Any known mathematical function may be used to design a resistivity profile along the longitudinal surface, for example, parabolic functions, hyperbolic function, exponential functions, combinations thereof, and so forth. The mathematical function may be a combination of two or more mathematical functions. The composition of the resistive powders, thickness of the layers, and thus the grading of resistivity of the monolith block may be designed such that the potential difference between the fixed contact, and the sliding contact is always such that conditions for arcing do not exist. For example, a rate of change of resistivity of the monolithic cassette may be small at the low resistivity end, and increase progressively over the length of the monolithic cassette, such that the rate of change of resistivity is high at the high resistivity end.

What is claimed is:

1. A monolithic cassette comprising:
a first end having a first electrical resistivity;
a second end having a second electrical resistivity, wherein the second electrical resistivity is higher than the first electrical resistivity; and
a continuous grain structure between the first end and the second end; wherein electrical resistivity of the monolithic cassette is graded such that the resistance varies continuously from the first end to the second end.

2. The monolithic cassette of claim 1, wherein the electrical resistivity is graded by up to 12 orders of magnitude between the first end and the second end.

3. The monolithic cassette of claim 1, wherein the electrical resistivity is graded by at least 12 orders of magnitude between the first end and the second end.

4. The monolithic cassette of claim 1, wherein the electrical resistivity is graded from 1 micro ohm meter to 1 mega ohm meter.

5. The monolithic cassette of claim 1 further comprising:
a ceramic composition and a conductive composition; wherein weight ratio of the ceramic composition to the conductive composition is graded between the first end and the second end.

6. The monolithic cassette of claim 5, wherein the ceramic composition comprises zinc oxide, aluminum oxide, aluminum nitride, boron nitride, silicon dioxide, indium tin oxide, or combinations thereof.

7. The monolithic cassette of claim 5, wherein the ceramic composition comprises 99.5 to 99.7 percent zinc oxide, and 0.3 to 0.5 percent aluminum oxide.

8. The monolithic cassette of claim 5, wherein the conductive composition comprises silver, copper, gold, aluminum, indium, tin, gallium, nickel, titanium, zinc, lead, carbon, iron, tungsten, molybdenum, or combinations thereof.

9. The monolithic cassette of claim 5, wherein each of the plurality of layers comprises:
45 to 58 percent by weight of the ceramic composition; and
42 to 55 percent by weight of silver.

10. The monolithic cassette of claim 5, wherein percentage weight of silver is graded along the length of the monolith cassette.

11. The monolithic cassette of claim 1, wherein the monolithic cassette exhibits at least one of the following properties:
Mohs harndess greater than 3;
root mean squared roughness less than 100 micron;
thermal stability greater than 300 degree Celsius; and
mechanical stability greater than 150 mega pascal.

12. A method of forming a monolithic cassette, the method comprising:
introducing a plurality of resistive powders into a die to form a stack of layers; wherein the plurality of resistive powders comprise a ceramic composition and a conductive composition, and wherein each layer comprises a distinct weight ratio of the ceramic composition and the conductive composition;
compacting the plurality of resistive powders into a green cassette at a pressure of 10 mega pascal and at ambient temperature; and
sintering the green cassette at a temperature below 925 degree Celsius for a duration of upto 24 hours.

13. The method of claim 12, wherein introducing the plurality of resistive powders into a die further comprises:
introducing a first of the plurality of resistive powders into the die;
settling the first of the plurality of resistive powders to form a first layer of substantially uniform thickness; and
repeating the introducing and settling for each of the plurality of resistive powders to form successive layers of the stack.

14. The method of claim 12, wherein:
the ceramic composition comprises zinc oxide, aluminum oxide, or combinations thereof;
the conductive composition comprises silver;
the compacting is performed at a pressure between 10 mega pascal and 60 mega pascal; and
the sintering is performed at a temperature between 850 degree Celsius and 950 degree Celsius in an atmosphere of air for a duration of 22 to 26 hours; wherein rate of change of temperature for sintering is between 1.5 and 2.5 degree Celsius per minute.

15. The method of claim 14, wherein the ceramic composition comprises a substantially homogenous mixture of 99.5 to 99.7 percent zinc oxide powder, and 0.3 to 0.5 percent aluminum oxide powder.

16. The method of claim 14, wherein each of the plurality of resistive powders comprises:
45 to 58 percent by weight of the ceramic composition; and
42 to 55 percent by weight of silver.

* * * * *